Paul W. Shadle
INVENTOR

Aug. 16, 1960 P. W. SHADLE 2,949,575
TEMPERATURE COMPENSATED BOLOMETER BIAS SUPPLY
Filed April 29, 1957 2 Sheets-Sheet 2

Paul W. Shadle
INVENTOR

BY

ATTORNEY

United States Patent Office 2,949,575
Patented Aug. 16, 1960

2,949,575

TEMPERATURE COMPENSATED BOLOMETER BIAS SUPPLY

Paul W. Shadle, La Canada, Calif., assignor to Hycon Mfg. Company, Pasadena, Calif., a corporation of Delaware Filed Apr. 29, 1957, Ser. No. 655,876

9 Claims. (Cl. 323—22)

The present invention relates generally to regulated power supplies and more particularly to a regulated power supply for providing temperature compensated bolometer bias.

The electrical signal developed by a thermistor bolometer for a given radiation signal is directly proportional to the bias voltage on the radiation sensing thermistor. The maximum voltage which a thermistor will support normally varies with temperature, however. Similarly, the optimum bias voltage for the thermistor also varies with temperature. In a particular type of thermistor, the optimum bias voltage varies from 654 volts at $-20°$ C., to 163 volts at $+60°$ C., for example. Thus, if the maximum temperature in a given application may reach $60°$ C., the bias voltage on the thermistor can be no more than 163 volts if a constant bias voltage is used. A constant bias voltage of this magnitude, however, does not result in maximum thermistor sensitivity at the lower operating temperatures.

It is a prime object of my invention to provide means for supplying the maximum permissible bias voltage across a bolometer thermistor at all times, whereby thermistor sensitivity will be at a maximum for any temperature in an operating range.

Briefly, the foregoing and other objects are preferably accomplished by providing a power supply unit in which the output voltage is regulated and controlled in magnitude according to the magnitude of a reference voltage. The reference voltage is adapted to vary with the change in resistance of a temperature sensitive element located in the same region of a radiation sensing bolometer thermistor, and which element is included in a network that causes the reference voltage to vary in magnitude in an approximately quadratic (second degree) manner with the sensing thermistor ambient temperature. The output voltage of the power supply unit is thus varied according to an optimum bias voltage curve, and applied to bias the radiation sensing bolometer thermistor to obtain maximum thermistor sensitivity. The temperature sensitive element can be a thermistor similar to the radiation sensing bolometer thermistor.

My invention possesses other objects and features, some of which together with the foregoing, will be set forth in the following description of a preferred embodiment of the invention, and the invention will be more fully understood by reading the description with joint reference to the accompanying drawings, in which.

Figure 1:
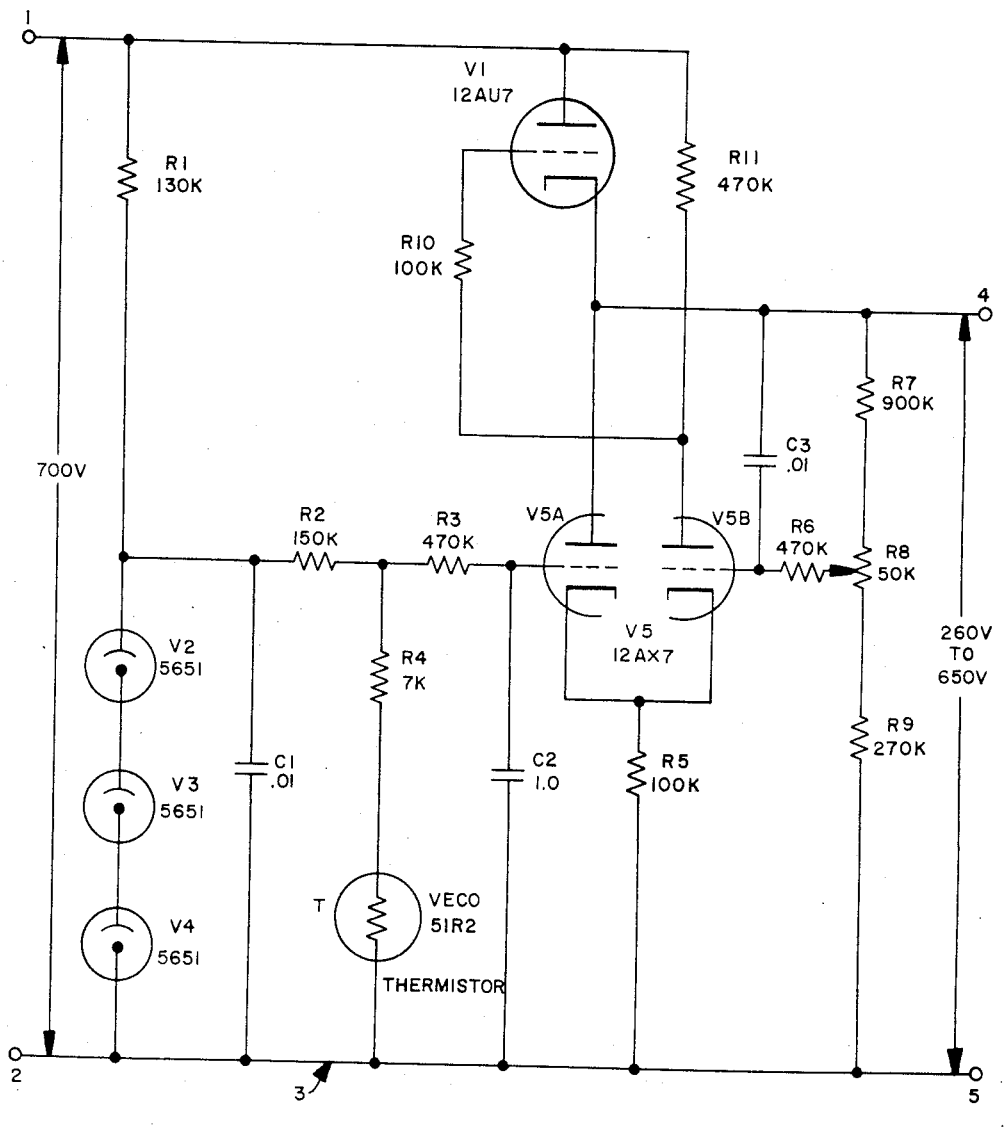
Figure 1 is a circuit diagram of a preferred embodiment of my invention.

A preferred embodiment of my invention is shown in Figure 1. Specific component values indicated in the drawing are not intended to restrict or limit the scope of the invention, but merely provide an example of a satisfactory working model. Resistor values are given in ohms and capacitor values are in microfarads. An input voltage of 700 volts D.C., for example, can be impressed across input terminals 1 and 2. Input terminal 1 is connected to one end of resistor R1 and to the anode of triode V1. The other end of resistor R1 is connected to the anode of glow tube V2. The cathode of V2 is connected to the anode of glow tube V3 and the cathode of V3 is, in turn, connected to the anode of glow tube V4. The cathode of V4 is connected to input terminal 2.

Each of the voltage regulator glow tubes sustain a constant drop of 87 volts, for example, and the three series glow tubes provide a drop of 261 volts. A stabilizing filter capacitor C1 is connected across the three series glow tubes V2, V3 and V4 as shown, and a resistor R2 in series with resistor R3 connects the upper plate of C1 to the control grid of one section V5A of a twin triode V5. One end of a resistor R4 is connected to the common junction of resistors R2 and R3, and a temperature sensitive thermistor T connects the other end of R4 to lead 3, which connects with input terminal 2. A capacitor C2 is connected between the control grid of V5A and lead 3. Resistor R3 and capacitor C2 form a filter which applies a filtered output to the control grid of V5A.

The cathode of triode V1 is connected to output terminal 4 and to the anode of V5A. The cathode of V5A is connected to lead 3 through a resistor R5. Lead 3 connects input terminal 2 to output terminal 5. The cathode of V5A is also connected directly to the cathode of V5B, and the control grid of V5B is connected to a limiting resistor R6. Three series resistors R7, R8 and R9 are connected across output terminals 4 and 5. Resistor R8 has an adjustable tap which is connected with the control grid of V5B through resistor R6. The adjustment of resistor R8 is such that the output voltage is the desired optimum bias voltage for any particular thermistor temperature, when the grid voltages of V5A and V5B are equal. The control grid of V5B is also connected to the output terminal 4 through differentiating capacitor C3.

The anode of V5B is connected to the control grid of triode V1 through limiting resistor R10 to control the effective resistance of V1. The anode of V5B is also connected to input terminal 1 through load resistor R11 for a supply voltage.

Figure 2:
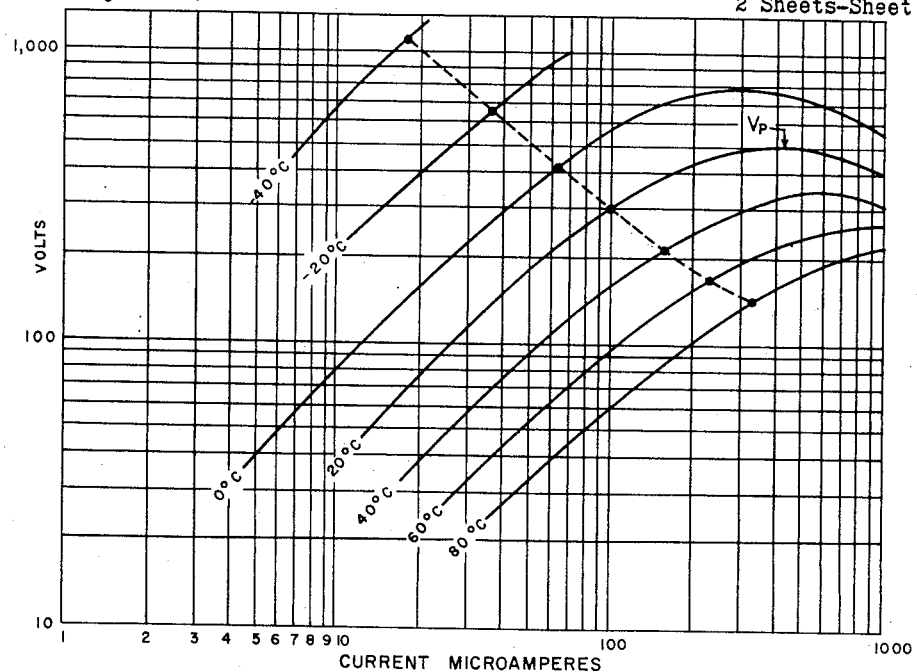
Figure 2 is a graph showing the static characteristics of a thermistor for different temperatures of the thermistor.

Operation of the invention will be more fully understood by examination of the static characteristics of a bolometer thermistor, which are shown in Figure 2. The static characteristics for different temperatures of the thermistor are indicated in this figure. The optimum bias voltage is approximately equal to 0.6 of the peak voltage $V_p$ which the thermistor will support, at the different temperatures, and is indicated by the broken line curve intersecting the static characteristics. It is seen that the optimum bias voltage for the illustrated thermistor varies from 654 volts at $-20°$ C. to 163 volts at $+60°$ C.

Figure 3:
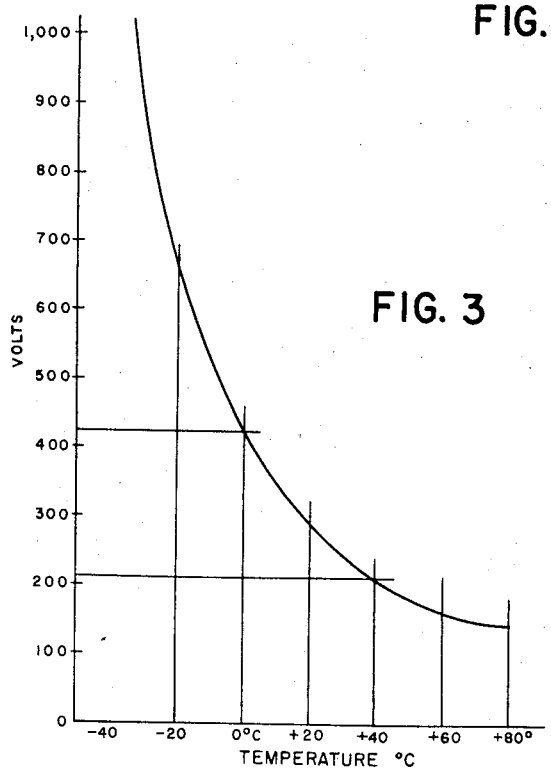
Figure 3 is a graph illustrating a plot of optimum bias voltage for a bolometer thermistor versus thermistor ambient temperature.

The manner in which the optimum bias voltage varies with thermistor ambient temperature is illustrated by the curve of Figure 3. If the bias voltage is made to vary according to this curve of bias voltage versus temperature, the maximum permissible bias voltage will at all times be impressed across the thermistor, and consequently the sensitivity will be at a maximum for any temperature. This is particularly desirable when the thermistor output is to be viewed and examined on an oscilloscope, for example, for detail information contained in the waveform. It is to be noted that the curve of Figure 3 can be closely approximated by a quadratic (second degree) curve.

A way of accomplishing this variation of bias voltage is to provide a regulated power supply in which the reference voltage controlling the output voltage is made variable according to the bolometer thermistor temperature. This is done by the elements comprising resistors R2 and R4, and the thermistor T (temperature sensitive element) in the grid circuit of V5A in Figure 1. The thermistor T can be located in the same region that the sensing bolometer thermistor (not shown) is located. Thus, the temperature of thermistor T changes exactly with the temperature of the bolometer thermistor.

The resistance of a thermistor varies with the ambient temperature of the thermistor, as indicated by the static characteristics shown in Figure 2. This effect is utilized to produce a bias voltage for the radiation sensing bolometer thermistor that is variable according to the curve of Figure 3. With this understanding, the operation of the circuit of Figure 1 will now be described.

The action of the regulating circuit of Figure 1 is such as to keep the grid voltages of the two sections of V5 at the same voltage. The input voltage across the input terminals 1 and 2 produces a fixed voltage cross the three regulator glow tubes V2, V3 and V4. This fixed voltage is applied to the network comprising R2, R4 and T, which is a temperature variable divider network. The output of the divider network is suitably applied to the control grid of V5A as a reference voltage. The triode V5A is connected as a cathode follower with a load reesistor R5.

The input voltage is applied through the series tube V1 which acts as a variable resistance controlled by its grid voltage. Since resistor R10 connects the control grid of V1 to the anode of V5B, the series resistance of V1 varies according to the anode potential of V5B. The cathode of V5B is also connected to resistor R5 which is the load resistor of cathode follower V5A. As is well known, the output impedance (to which the cathode of V5B is connected) of a cathode follower is very low, and very little degenerative feedback exists with triode V5B.

The grid voltage of V5B is determined by the output through R6 of the divider network comprising resistors R7, R8 and R9 connected across the output terminals 4 and 5. For any particular temperature of thermistor T the grid voltage of V5A is fixed. If the output voltage between output terminals 4 and 5 is correct, the grid voltage on V5B will be equal to the reference voltage on the grid of V5A. If the grid voltage on V5A is increased (raised) due to a change in thermistor T temperature, for example, more current is drawn through V5A such that the cathode potential of V5B is raised. The rise in cathode potential of V5B effectively reduces the grid voltage on V5B, decreasing current flow through it. The anode potential of V5B accordingly rises and this change is applied to the control grid of V1 through resistor R10. The effective resistance of V1 is thereby reduced, causing a smaller voltage drop across V1 and increasing the output voltage between output terminals 4 and 5. This increases the grid voltage on V5B to be equal to that on V5A. The anode potential of V5A is also increased; however, this produces a substantially negligible rise in cathode potential of V5A. The amplification of V1 and V5B is sufficiently high and the feedback loop is so tight that the grid voltage on V5B directly follows the rise of voltage on the cathode of V5A while the cathode to grid voltage of V5B remains substantially constant, an extremely small change however occurring to vary the effective resistance of V1 and produce an output voltage between output terminals 4 and 5 which is the correct bias voltage for thermistor temperature.

The grid voltage on V5A is the reference voltage which establishes the value of the output voltage since the simulating grid voltage on V5B is a fixed fraction of the output voltage. The reference voltage in turn is determined by the output of the divider network comprising resistors R2 and R4, and thermistor T which is located in the same temperature region as the bolometer thermistor (not shown). It is clearly seen from Figure 1 that the fixed, regulated voltage across the glow tubes V2, V3 and V4 is attenuated by the factor $$\frac{R4+RT}{R2+R4+RT}$$

to produce the reference voltage, where RT is the temperature varying resistance of the thermistor T. This is of the form, $$y = K1\left(\frac{K2+x}{K3+x}\right)$$

where $x$ is an independent variable and $y$ is the dependent variable, and can be easily recognized as representing a quadratic or second degree curve. This curve can be made to approximate the curve of Figure 3 very closely by correct choice in values of K1, K2 and K3.

If the reference voltage on the grid of V5A is reduced (lowered) due to change in thermistor T temperature, the effective resistance of V1 is increased, causing a larger voltage drop across it so that the ouput voltage between output terminals 4 and 5 is reduced, and the grid voltage on V5B follows the drop of cathode potential of V5A. As before, the cathode to grid voltage of V5B remains substantially constant, an extremely small change occurring however to vary the current through the tube. The resultant change of anode potential of V5B adjusts through resistor R10 the effective resistance of V1 for a correct output voltage, and, of course, the grid voltage on V5B.

The thermistor T has a negative resistance versus temperature characteristic. When the thermistor is operated at a sufficiently low current, its temperature is that of its surroundings, and its resistance is then an accurate indication of the ambient temperature. To match the output voltage from across output terminals 4 and 5 to the desired bias voltage for the radiation sensing thermistor as shown in Figure 3, it is only necessary to choose R2, R4 and the thermistor T correctly. The values indicated in Figure 1 provide an output voltage which follows the curve of Figure 3 very closely.

It is to be understood that the particular embodiment of my invention described above and shown in the drawings is merely illustrative of and not restrictive on the broad invention, and that various changes in design, structure and arrangement may be made without departing from the spirit and scope of the broader of the appended claims.

I claim:

1. A regulated power supply having a variable output voltage, comprising: an input divider circuit including a resistance connected in series with voltage regulating means, said input divider circuit being connected to a source of input voltage and said voltage regulating means providing a fixed voltage output; a variable divider circuit including means responsive proportionally to variations of an independent variable, said variable divider network being connected to said voltage regulating means and providing a reference voltage variable with the independent variable; means for providing a comparison voltage proportional to the output voltage of said power supply; means for comparing the magnitudes of said reference voltage and said comparison voltage; and means responsive to the difference in magnitude between said comparison voltage and said reference voltage for varying said output voltage according to said difference, whereby said comparison voltage is made effectively equal to said reference voltage.

2. A regulated power supply having a variable output voltage, comprising: means for providing a reference voltage variable substantially quadratically with an independent variable; means for providing a comparison voltage proportional to the output voltage of said power supply; means for comparing the magnitudes of said reference voltage and said comparison voltage; and means responsive to the difference in magnitude between said comparison voltage and said reference voltage for varying said output voltage according to said difference, whereby said comparison voltage is made effectively equal to said reference voltage.

3. The invention according to claim 2 in which said independent variable is the ambient temperature of a signal sensing device, said device being biased by the output voltage of said power supply.

4. A regulated power supply having a variable output voltage, comprising: means for providing a reference voltage inversely proportional substantially quadratically to an independent variable; means for providing a comparison voltage proportional to the output voltage of said power supply; a cathode follower having an input and an output, said input connected to receive said reference voltage; an amplifier including a cathode, grid and anode, said cathode connected to said output to vary in potential with change of said reference voltage, and said grid connected to vary in potential with said comparison voltage; and resistance means responsively variable according to the potential of the anode of said amplifier for varying said output voltage, whereby said comparison voltage is made effectively equal to said reference voltage.

5. The invention according to claim 4 in which said independent variable is the ambient temperature of a signal sensing device, said device being biased by the output voltage of said power supply.

6. A regulated power supply having a variable output voltage, comprising: means for providing a reference voltage, variable with an independent variable, said independent variable being the ambient temperature of a signal sensing device which is biased by the output voltage of said power supply; means for providing a comparison voltage proportional to the output voltage of said power supply; means for comparing the magnitudes of said reference voltage and said comparison voltage; and means responsive to the difference in magnitude between said comparison voltage and said reference voltage for varying said output voltage according to said difference, whereby said comparison voltage is made effectively equal to said reference voltage.

7. The invention according to claim 6 in which said means for providing a reference voltage variable with an independent variable comprises a divider network having an input adapted to be connected to a source of fixed voltage and an output for providing said reference voltage, said divider network including means responsive proportionately to the variations of said independent variable for varying said reference voltage according to said variations.

8. The invention according to claim 3 in which said means for providing a reference voltage variable substantially quadratically with an independent variable comprises a divider network including a first resistance connected in series with a second resistance, said second resistance being variable proportionately to the variations of said independent variable, said divider network adapted to be connected across a source of fixed voltage and said reference voltage being obtained across said second resistance.

9. The invention according to claim 5 in which said means for providing a reference voltage inversely proportional substantially quadratically to an independent variable comprises a divider network including a first resistance connected in series with a second resistance and a third resistance connected in series with said second resistance, one of said latter two resistances being variable proportionately to the variations of said independent variable, said divider network adapted to be connected across a source of fixed voltage and said reference voltage being obtained across said latter two resistances.

References Cited in the file of this patent

UNITED STATES PATENTS

| | | |
|---|---|---|
| 2,332,073 | Grierson | Oct. 19, 1943 |
| 2,475,640 | Rich | July 12, 1949 |
| 2,594,006 | Friend | Apr. 22, 1952 |
| 2,762,964 | Sechrist | Sept. 11, 1956 |
| 2,806,193 | Koppel | Sept. 10, 1957 |